United States Patent [19]

Schmidlin et al.

[11] Patent Number: 5,040,004

[45] Date of Patent: Aug. 13, 1991

[54] BELT DONOR FOR DIRECT ELECTROSTATIC PRINTING

[75] Inventors: Fred W. Schmidlin, Pittsford; Robert G. Martin, Rochester, both of N.Y.

[73] Assignee: Xerox Corporation, Stamford, Conn.

[21] Appl. No.: 452,016

[22] Filed: Dec. 18, 1989

[51] Int. Cl.[5] .................. G01D 15/06; G03G 15/06

[52] U.S. Cl. .................. 346/159; 346/160.1; 355/259

[58] Field of Search .................. 346/153.1, 159, 160.1, 346/155; 355/246, 252, 259

[56] References Cited

U.S. PATENT DOCUMENTS

| | | | |
|---|---|---|---|
| 3,437,074 | 4/1969 | Hagopian et al. | 355/252 |
| 3,689,935 | 9/1972 | Pressman et al. | 346/74 ES |
| 3,824,924 | 7/1974 | Rarey et al. | 346/159 |
| 3,910,231 | 10/1975 | Inoue et al. | 355/259 |
| 3,914,460 | 10/1975 | Maksymiak | 355/259 |
| 3,997,688 | 12/1976 | Gundlach et al. | 355/259 |
| 4,067,295 | 1/1978 | Parker et al. | 355/259 |
| 4,112,437 | 9/1978 | Mir et al. | 346/159 |
| 4,370,056 | 1/1983 | Hays | 355/259 |
| 4,491,855 | 1/1985 | Fujii et al. | 346/159 |
| 4,568,955 | 2/1986 | Hosoya et al. | 346/153.1 |
| 4,743,926 | 5/1988 | Schmidlin et al. | 346/159 |
| 4,780,733 | 10/1988 | Schmidlin | 346/160.1 |
| 4,814,796 | 3/1989 | Schmidlin | 346/155 |
| 4,839,670 | 6/1989 | Snelling | 346/153.1 |
| 4,876,561 | 10/1989 | Schmidlin | 346/159 |
| 4,903,049 | 2/1990 | Sotack | 346/159 |

*Primary Examiner*—Benjamin R. Fuller
*Assistant Examiner*—Randy W. Gibson

[57] ABSTRACT

Direct electrostatic printing apparatus including structure for delivering developer/toner particles to a printhead forming an integral part of the printing device. The developer/toner delivery system insures even distribution to an apertured printhead structure. To this end, toner is deposited on a donor belt using a magnetic brush structure. The belt is entrained about a drive roller and an idler roller as well as a stationary mandrel. The mandrel is positioned opposite the printhead structure with a portion of the belt disposed intermediate thereof. The mandrel is provide with a flat area which is coplanar with the printhead structure. The flat area is coextensive with the space occupied a plurality rows of apertures in the printhead to thereby provide a uniform spacing between each row of apertures and the toner delivery belt.

6 Claims, 1 Drawing Sheet

BELT DONOR FOR DIRECT ELECTROSTATIC PRINTING

BACKGROUND OF THE INVENTION

This invention relates to a direct electrostatic printing device and more particularly to a toner delivery system therefor.

Of the various electrostatic printing techniques, the most familiar is that of xerography wherein latent electrostatic images formed on a charge retentive surface are developed by a suitable toner material to render the images visible, the images being subsequently transferred to plain paper.

A less familiar form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fujii et al discloses a method and apparatus utilizing a controller having a plurality of openings or slit-like openings to control the passage of one-component insulative magnetic toner and to record a visible image by the charged particles directly on an image receiving member. Fuji, et al. show an apertured printhead structure having wedge-shaped apertures wherein the larger diameter of an aperture is delineated by a signal or control electrode and is disposed opposite an image receiving substrate.

U.S. Pat. No. 4,568 955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. Pat. No. 4,814,796 granted to Fred W. Schmidlin on Mar. 21, 1989 discloses a direct electrostatic printing apparatus including a toner delivery system wherein a donor roller is employed to present charged toner to an apertured printhead, toner being deposited on the donor roller via a magnetic brush structure. The donor roller is positioned adjacent the printhead structure to form a nip area therebetween. For certain donor roll/printhead aperture configurations, a donor roll with a curvature such as the one disclosed in the '796 patent will not deliver the toner uniformly to each row of apertures unless the donor roll has an unacceptably large diameter.

BRIEF DESCRIPTION OF THE INVENTION

The present invention provides a developer or toner delivery system disposed to one side of an apertured printhead and an electrically biased shoe or electrode which is disposed to the opposite side of the printhead from the toner delivery system.

The toner delivery system of the present invention insures even distribution to an apertured printhead structure. To this end, toner is deposited on a donor belt using a magnetic brush structure. The belt is entrained about a drive roller and an idler roller as well as a stationary mandrel. The mandrel is positioned opposite the printhead structure with a portion of the belt disposed intermediate thereof. The mandrel is provide with a flat area which is coplanar with the printhead structure. The flat portion is coextensive with the space occupied by the rows of apertures in the printhead to thereby provide a uniform distance between each row of apertures and the toner delivery belt.

DETAILED DESCRIPTION OF THE DRAWINGS

Figure 1:
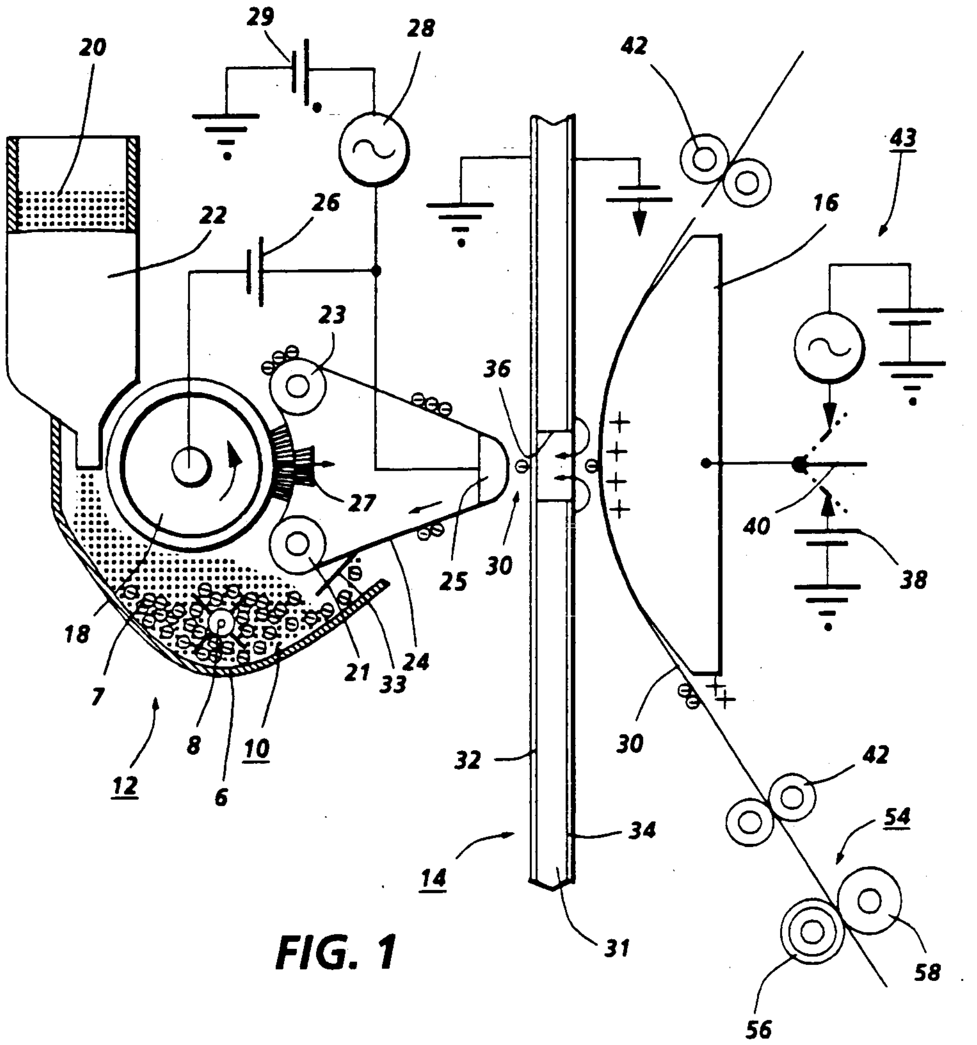
Figure 2:
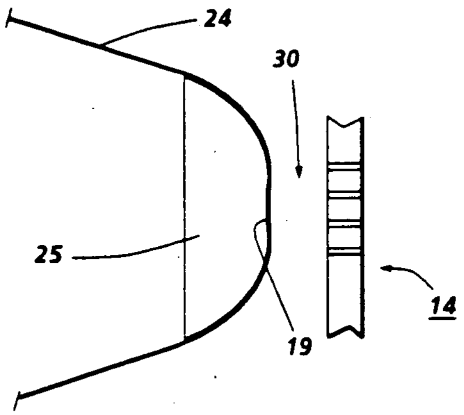

FIG. 1 is a schematic illustration of a printing apparatus representing the present invention; and FIG. 2 is an enlarged fragmentary cross sectional view of a portion of a printhead structure and a toner delivery system illustrating the spacing be between the toner delivery system and the rows of apertures of the printhead structure.

DESCRIPTION OF THE PREFERRED EMBODIMENT OF THE INVENTION

Disclosed in the Figure is an embodiment of a direct electrostatic printing apparatus 10 representing the invention. The printing apparatus 10 includes a developer delivery system generally indicated by reference character 12, a printhead structure 14 and a backing electrode or shoe 16.

The developer delivery system 12 includes a conventional magnetic brush 18 supported for rotation adjacent a supply of toner 20 contained in a hopper 22. A developer donor belt 24 is supported for movement intermediate the magnetic brush 18 and the printhead structure 14. The donor belt structure which is preferably fabricated of polyvinyl fluoride doped with carbon black is spaced from the printhead approximately 0.003 to 0.015 inch. The magnetic brush has a dc bias of about 100 volts applied thereto via a dc voltage source 26. A grounded conductive brush 27 contacts the inside of the belt 24 opposite the side contacted by the developer brush 18. An AC voltage of about 400 volts provided by source 28 with a dc bias of 20 volts provided by source 29 is applied to the mandrel 25. The applied voltages are effective to cause attraction of toner from the brush 18 and to cause transfer of a monolayer of toner to the donor belt 24 from the brush 18. The monolayer is subsequently jumped to the vicinity of the apertures of the printhead. The 20 volts dc bias precludes collection of right sign toner on the shield electrode of the printhead.

The toner 20 enters a developer housing 6 where it is mixed with carrier particles 7 by means of a paddle wheel 8. The toner is dispensed from the hopper 22 as it is depleted from the mixture of carrier and toner in the housing 6. Control of the toner dispensed form the housing may be accomplished in accordance with well known techniques in the art.

The donor belt 24 is entrained about a drive roller 21, idler roller 23 and a stationary mandrel 25. The mandrel 25 is provided with a flat area 19 and the mandrel is positioned such that the flat area is disposed adjacent the rows of apertures in the printhead structure. With the belt moving over the flat area a nip area 30 is formed intermediate the belt and the printhead. The flat area coplanar with the printhead structure is coextensive (FIG. 2) with the space occupied by the rows of apertures in the printhead to thereby provide a uniform spacing across the nip whereby the spacing between each row of apertures and the toner delivery belt is uniform. A scraper 33 contacting the belt 24 at an angle serves to scrape unused toner from the belt. The toner so removed falls into a housing, not shown, from where it can be returned to the hopper 22 by a toner transport, not shown.

The developer preferably comprises any suitable insulative nonmagnetic toner/carrier combination having Aerosil (Trademark of Degussa, Inc.) contained therein in an amount equal to ½% by weight and also having zinc stearate contained therein in an amount equal to 3% by weight.

The printhead structure 14 comprises a layered member including an electrically insulative base member 31 fabricated from a polyimide film approximately 0.001 inch thick. The base member is clad on the one side thereof with a continuous conductive layer or shield 32 of aluminum which is approximately one micron thick. The opposite side of the base member 30 carries segmented conductive layer 34 thereon which is fabricated from aluminum. A plurality of rows of holes or apertures 36 (only one of which is shown) are provided in the layered structure in a pattern suitable for use in recording information. The apertures form an electrode array of individually addressable electrodes. With the shield grounded and zero to +50 volts applied to an addressable electrode, toner is propelled through the aperture associated with that electrode. The aperture extends through the base 31 and the conductive layers 32 and 34.

A preferred aperture configuration is disclosed in U.S. patent application Ser. No. 452,159 filed on 12/18/89 in the name of Schmidlin et al and assigned to the same assignee as the instant application.

With a negative 300 volts applied to an addressable electrode toner is prevented from being propelled through the aperture. Image density can be varied by adjusting the voltage on the control electrodes between 0 and minus 300 volts. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 30 from the printhead deflects the recording medium in order to provide an extended area of contact between the medium and the shoe.

The recording medium 30 may comprise cut sheets of paper fed from a supply tray 40. The sheets of paper which are spaced from the printhead 14 a distance in the order of 0.003 to 0.030 inch as they pass therebetween. The sheets 30 are transported in contact with the shoe 16 via edge transport roll pairs 42.

During printing the shoe 16 is electrically biased to a dc potential of approximately 400 volts via a dc voltage source 38.

Periodically, between printed pages, a switch 40 is actuated in the absence of a sheet of paper between the printhead and the shoe such that a dc biased AC power supply 43 is connected to the the shoe 16 to effect cleaning of the printhead. The voltage supplied by the source 43 is of the same frequency as that (i.e. source 28) used to jump the toner from the toner supply system but it is 180 degrees out of phase with it. This causes the toner in the gap between the paper and the printhead to oscillate and bombard the printhead.

Momentum transfer between the oscillating toner and any toner on the control electrodes of the printhead causes the toner on the control electrodes to become dislodged. The toner so dislodged is deposited on the substrates subsequently passed over the shoe 16.

At the fusing station, a fuser assembly, indicated generally by the reference numeral 54, permanently affixes the transferred toner powder images to sheet 30. Preferably, fuser assembly 54 includes a heated fuser roller 56 adapted to be pressure engaged with a back-up roller 58 with the toner powder images contacting fuser roller 56. In this manner, the toner powder image is permanently affixed to copy substrate 30. After fusing, chute, not shown, guides the advancing sheet 30 to catch tray (not shown) for removal from the printing machine by the operator.

What is claimed is:

1. Apparatus for forming images including a toner delivery system, a printhead containing a plurality of apertures adapted to transport toner therethrough which toner is supplied by said delivery system to a vicinity of said apertures and means for supporting image receiving substrates for movement past said printhead, said supporting means attracting toner transported from said delivery system through said printhead whereby said toner is deposited in image configuration on said image receiving substrate, the improvement comprising:

means for delivering toner uniformly to a plurality of rows of apertures in said printhead; and said toner delivery means comprising a belt and a stationary mandrel having said belt entrained thereabout, said mandrel being positioned adjacent said rows of apertures.

2. Apparatus according to claim 1 wherein said rows are coplanar.

3. Apparatus according to claim 2 wherein said stationary mandrel has a flat area which is disposed opposite said rows of apertures and coextensive therewith.

4. Apparatus for forming images including a toner delivery system, a printhead containing a plurality of apertures adapted to transport toner therethrough which toner is supplied by said delivery system to a vicinity of said apertures and means for supporting image receiving substrates for movement past said printhead, said supporting means attracting toner transported from said delivery system through said printhead whereby said toner is deposited in image configuration on said image receiving substrate, the improvement comprising:

means for toner delivery which is uniformly spaced from a plurality of rows of apertures in said printhead.

said toner delivery system comprising a belt and a stationary mandrel having said belt entrained thereabout, said mandrel being positioned adjacent said rows of apertures.

5. Apparatus according to claim 4 wherein said stationary mandrel has a flat area which is disposed opposite said rows of apertures and coextensive therewith.

6. Apparatus according to claim 5 wherein said rows are coplanar.

* * * * *